United States Patent
Chen et al.

(10) Patent No.: US 10,871,705 B2
(45) Date of Patent: Dec. 22, 2020

(54) PROJECTION DEVICE

(71) Applicant: Coretronic Corporation, Hsin-Chu (TW)

(72) Inventors: Wei-Hao Chen, Hsin-Chu (TW);
Shu-Yu Lin, Hsin-Chu (TW);
Chia-Ching Tso, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/881,001

(22) Filed: May 22, 2020

(65) Prior Publication Data

US 2020/0371411 A1 Nov. 26, 2020

(30) Foreign Application Priority Data

May 24, 2019 (CN) ............. 2019 2 0756771 U

(51) Int. Cl.
| | | |
|---|---|---|
| *G03B 21/14* | (2006.01) | |
| *H04N 9/31* | (2006.01) | |
| *G03B 21/28* | (2006.01) | |
| *G03B 21/00* | (2006.01) | |

(52) U.S. Cl.
CPC ......... *G03B 21/142* (2013.01); *G03B 21/003* (2013.01); *G03B 21/28* (2013.01); *H04N 9/3102* (2013.01)

(58) Field of Classification Search
CPC .... G03B 21/14; G03B 21/003; G03B 21/005; G03B 21/006; G03B 21/008; H04N 9/31; H04N 9/3102; H04N 9/3108

USPC .................................................. 353/31, 34
See application file for complete search history.

(56) References Cited

U.S. PATENT DOCUMENTS

| | | | | |
|---|---|---|---|---|
| 7,270,417 B2 * | 9/2007 | Choi | ............ | G02B 26/0875 348/745 |
| 2005/0275810 A1 * | 12/2005 | Choi | ............ | G03B 21/005 353/69 |
| 2008/0165327 A1 * | 7/2008 | Takagi | ............ | G03B 21/2033 353/85 |
| 2013/0201225 A1 * | 8/2013 | Choi | ............ | H04N 9/3167 345/690 |
| 2020/0174357 A1 * | 6/2020 | Chen | ............ | H04N 9/3188 |

FOREIGN PATENT DOCUMENTS

TW         I631409         8/2018

* cited by examiner

*Primary Examiner* — William C. Dowling
(74) *Attorney, Agent, or Firm* — JCIPRNET

(57) ABSTRACT

The invention provides a projection device, comprising an illumination system, a light valve, a light guide element, an optical module and a projection lens. The optical module comprises a fixed portion, a first frame body, at least one first driving element and an optical element. The first frame body is pivoted to the fixed portion and comprises a first side and other three second sides. The first driving element is configured on at least one of the other three second sides and configured to drive the first frame body to oscillate back and forth. A first virtual plane of the projection lens intersects with a second virtual plane of the light valve to form a virtual line segment. The distance between the first side and the virtual line segment is shorter than the distance between the other three second sides and the virtual line segment.

14 Claims, 7 Drawing Sheets

PROJECTION DEVICE

CROSS-REFERENCE TO RELATED APPLICATION

This application claims the priority benefit of China application serial no. 201920756771.1, filed on May 24, 2019. The entirety of the above-mentioned patent application is hereby incorporated by reference herein and made a part of this specification.

BACKGROUND

Technical Field

The invention relates to an optical device. More particularly, the invention relates to a projection device.

Description of Related Art

Projection device is a display device for generating large-scale images. The imaging principle of the projection device is to convert an illumination beam generated by a light source into an image beam by a light valve, and then to project the image beam onto a screen or wall by a projection lens. However, in the existing products, in order to further increase the image resolution, a high-resolution light valve can be used in projection devices, but it will lead to the problem that the projection devices are expensive. In addition, in some projection devices, additional resolution enhancement elements with an optical oscillation technology can be configured to further enhance the resolution of the image converted by the light valve. However, in addition to the problems of large size and high cost, the common resolution enhancement elements further has the problem that the light valves or lenses are interfered such that the optical quality is reduced.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection device, which can improve the optical quality, reduce the size, reduce the cost and prevent the projection lens or the light valve from being interfered.

The other purposes and advantages of the invention can be further understood from the technical characteristics disclosed by the invention.

In order to achieve one, part or all of the above purposes or other purposes, one embodiment of the invention provides a projection device, comprising an illumination system, a light valve, a light guide element, an optical module and a projection lens. The illumination system is configured to provide an illumination beam. The light valve is configured on the transmission path of the illumination beam and configured to convert the illumination beam into an image beam. The light guide element is configured on the transmission path of the image beam and located between the illumination system and the light valve. The optical module is configured on the transmission path of the image beam. The optical module comprises a fixed portion, a first frame body, at least one first driving element and an optical element. The first frame body is pivoted to the fixed portion, wherein the first frame body comprises a first side and other three second sides. The at least one first driving element is configured on at least one of the other three second sides of the first frame body and configured to drive the first frame body to oscillate back and forth. The optical element is configured in the first frame body and configured to allow the image beam to pass. The projection lens is configured on the transmission path of the image beam and configured to convert the image beam into a projection beam, wherein a first virtual plane of the projection lens intersects with a second virtual plane of the light valve to form a virtual line segment, wherein the distance between the first side of the first frame body and the virtual line segment is shorter than the distance between the other three second sides of the first frame body and the virtual line segment. When oscillating, the optical element oscillates with the first frame body to enable the transmission path of the image beam to produce a displacement in a first direction.

Based on the above, the embodiment of the invention has at least one of the following advantages or effects. In the projection device provided by the embodiment, the optical module used for enhancing the image resolution comprises a first frame body and at least one first driving element configured thereon, wherein the configuration position of the at least one first driving element is far away from the extension intersection between the projection lens and the light valve. Therefore, the size can be reduced and the projection lens or light valve can be prevented from being interfered by the first driving element in the optical module. In this way, the resolution of the image can be enhanced and the projection device has good optical effect. At the same time, compared with the traditional configuration, the projection device has the advantages of lower cost and smaller size.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
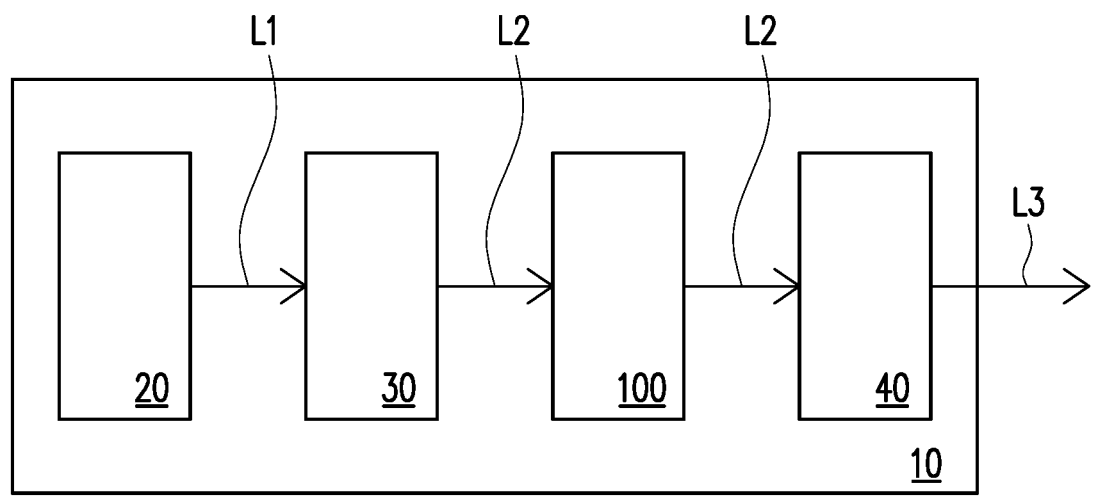
FIG. 1 is a block diagram of a projection device according to one embodiment of the invention.

FIG. 1 is a simple diagram of a projection device according to one embodiment of the invention. Please refer to FIG. 1. In the embodiment, the projection device 10 comprises an illumination system 20, a light valve 30, a light guide element (refer to light guide element 50 illustrated in FIG. 2), an optical module 100 and a projection lens 40.

The illumination system 20 is configured to provide an illumination beam L1. For example, in the embodiment, the illumination system 20 consists of, for example, a plurality of light emitting elements, wavelength conversion elements, light homogenizing elements, light filtering elements and a plurality of light splitting and combining elements, and is configured to provide light with different wavelengths as a source of image light. However, the invention does not limit the type or form of the illumination system 20 in the projection device 10, and for its detailed structure and implementation mode, enough teaching, recommendation and implementation description can be obtained from general knowledge in the technical field, which thus will be not be repetitively described.

The light valve 30 is configured on the transmission path of the illumination beam L1 and configured to convert the illumination beam L1 into an image beam L2. In the embodiment, the light valve 30 is, for example, a reflective light modulator such as a Liquid Crystal on Silicon panel (LCoS panel) or a Digital Micro-mirror Device (DMD). In some embodiments, the light valve 30 may also be a transparent light modulator such as a Transparent Liquid Crystal Panel, an Electro-Optical Modulator, a Magneto-Optic modulator or an Acousto-Optic Modulator (AOM). In this example, the digital micro-mirror device will be used as the light valve 30 for example, but the form and type of the light valve 30 are not limited in the invention. With respect to the method for the light valve 30 to convert a light beam LB into an image beam L2, for its detailed steps and implementation mode, enough teaching, recommendation and implementation description can be obtained from the general knowledge in the technical field, which thus will not be repetitively described. In the embodiment, the diagonal length of the light valve 30 is smaller than or equal to 0.33 inch. Therefore, it can be used in small projectors or micro projectors.

Figure 2:
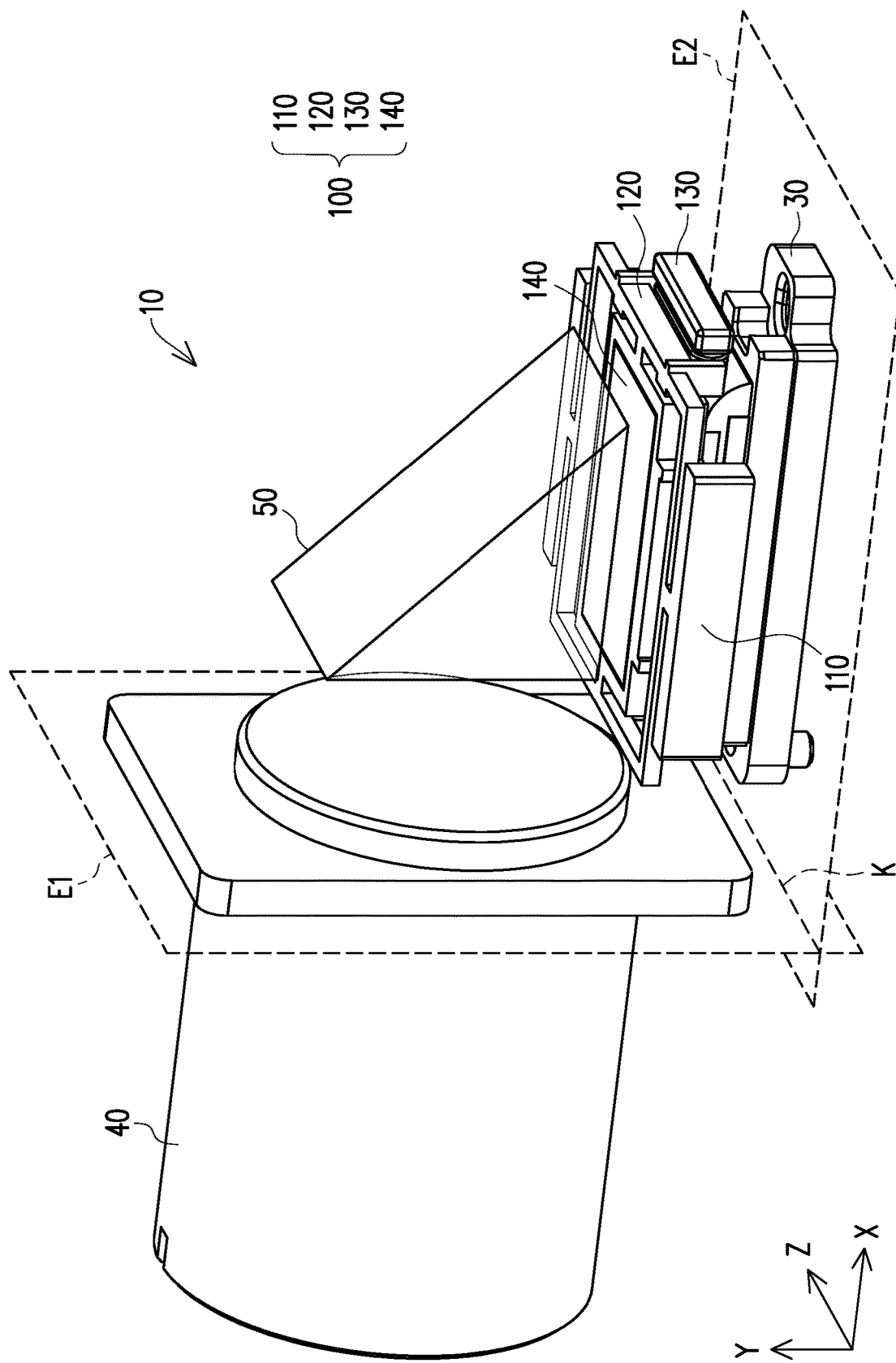
FIG. 2 is a stereoscopic schematic view of part of a projection device according to one embodiment of the invention.

FIG. 2 is a stereoscopic schematic view of part of a projection device according to one embodiment of the invention. Please simultaneously refer to FIG. 1 and FIG. 2. The light guide element 50 is configured on the transmission path of the image beam L2, and the light guide element 50 is located between the illumination system 20 and the light valve 30. In the embodiment, the light guide element 50 is, for example, a reflective prism with a coating. The illumination beam L1 provided by the illumination system 20 can be transmitted to the light valve 30 through the light guide element 50 to generate the image beam L2 which is reflected back to the light guide element 50. The coating side of the light guide element 50 reflects the image beam L2 to enable the image beam L2 to be transmitted to the projection lens 40. The invention does not limit the form and type of the light guide element 50. In some embodiments, the transmission path of the illumination beam L1 and the image beam L2 may also be changed. For the path or mode for the light guide element 50 to transmit the illumination beam L1 and image beam L2, enough teaching, recommendation and implementation description can be obtained from the general knowledge in the technical field, which thus will not be repetitively described.

The projection lens 40 is configured on the transmission path of the image beam L2 and configured to convert the image beam L2 into a projection beam L3. In the embodiment, the optical axis direction of the projection lens 40 is perpendicular to the normal direction of the light valve 30, but the invention is not limited thereto. Specifically, the projection lens 40 comprises, for example, combinations of one or a plurality of optical lenses with dioptre, such as various combinations of non-planar lenses such as biconcave lenses, biconvex lenses, concave-convex lenses, convex-concave lenses, plano-convex lenses and plano-concave lenses. In one embodiment, the projection lens 40 may further comprise a planar optical lens for projecting the projection beam L3 to the projection target in a reflective manner. The invention does not limit the form and type of the projection lens 40. It is worth noting that, in the embodiment, the shortest optical path length of the light valve 30 through the light guide element 50 to the projection lens 40 is smaller than or equal to 50 mm. In addition, in other embodiments, the shortest optical path length of the light valve 30 through the light guide element 50 to the projection lens 40 may be smaller than or equal to 30 mm. Therefore, it can be used in small projectors or micro projectors.

Figure 3:
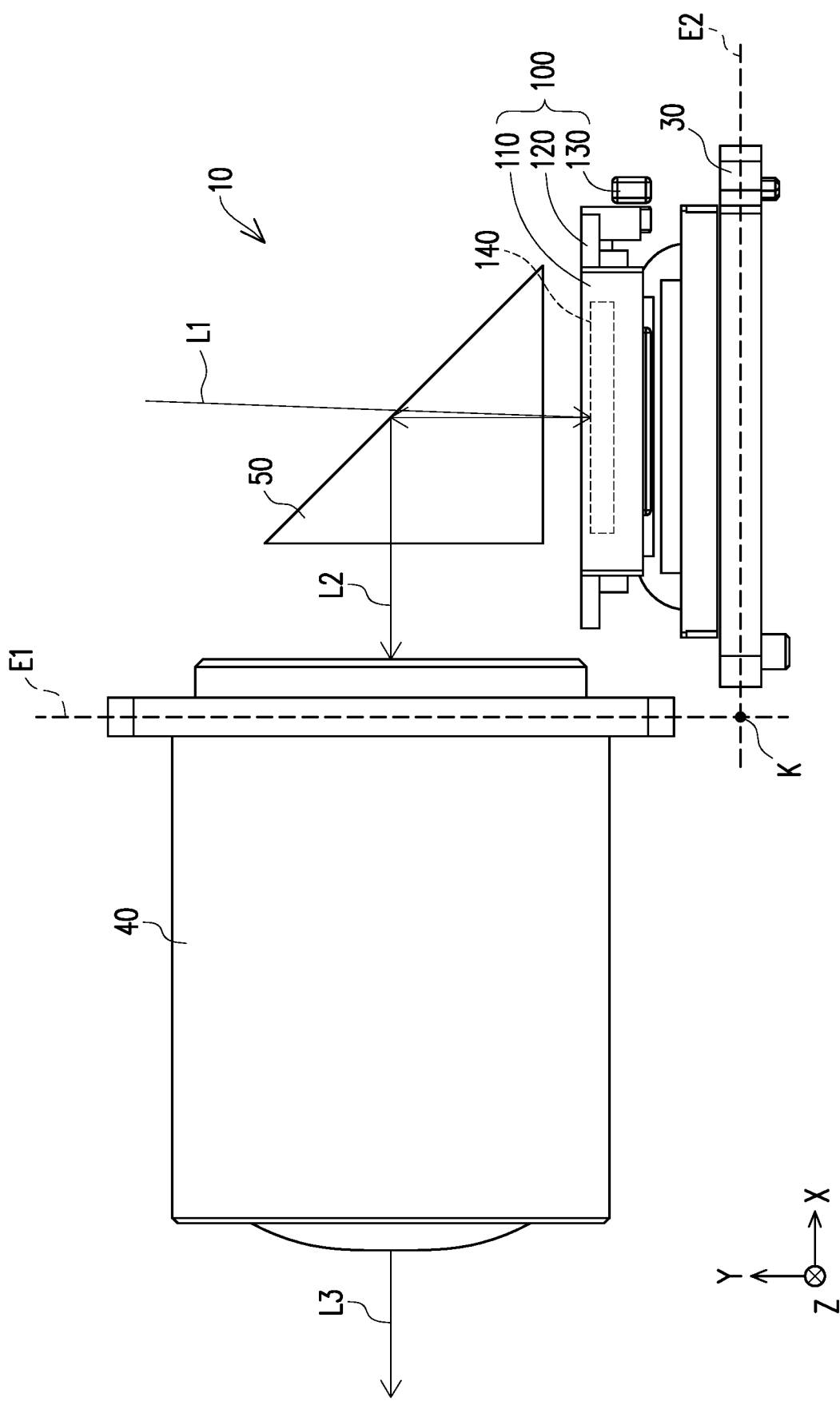
FIG. 3 is a side schematic view of part of the projection device illustrated in FIG. 2.
Figure 4:
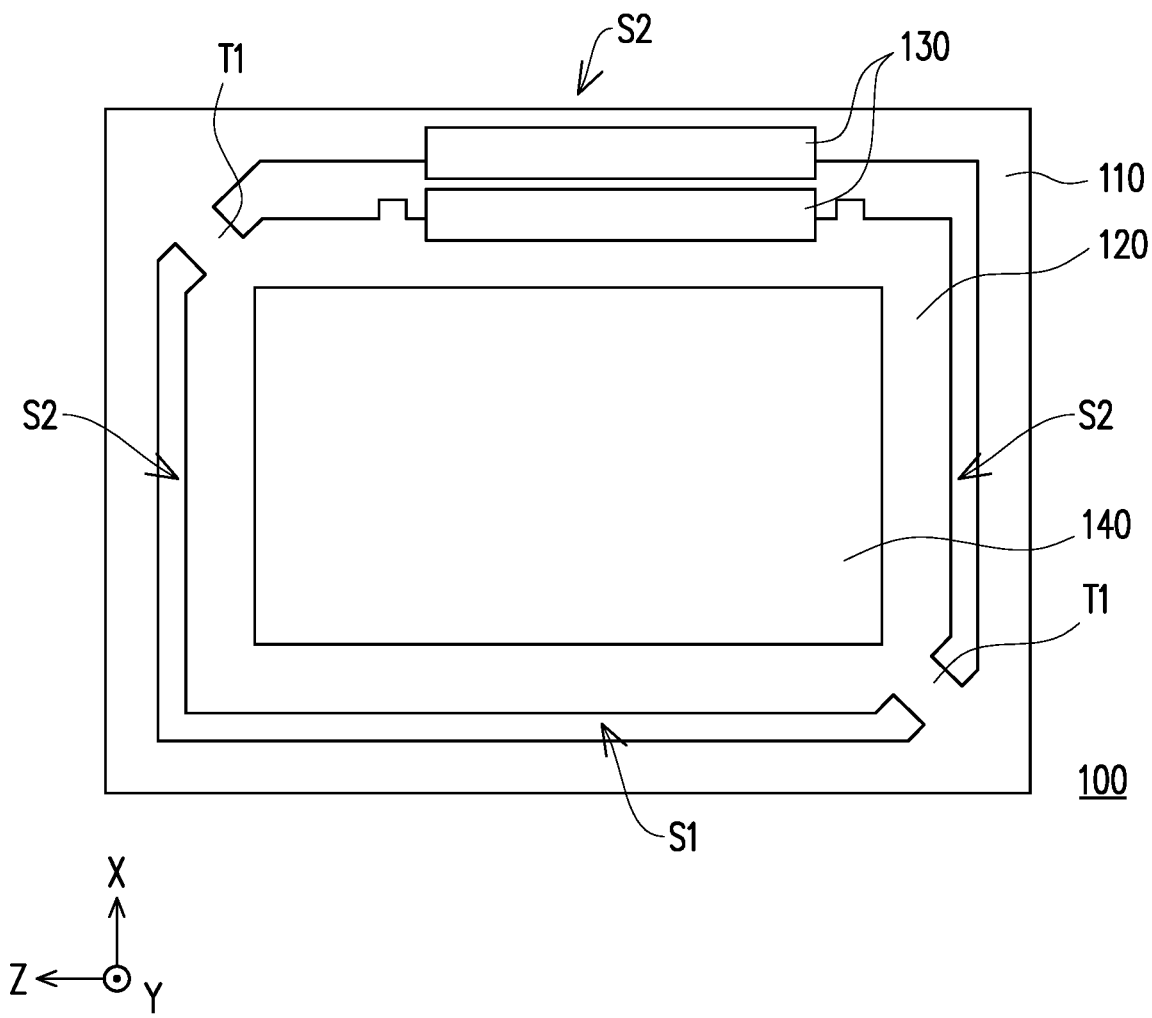
FIG. 4 is a front schematic view of an optical module in the embodiment illustrated in FIG. 2.

FIG. 3 is a side schematic view of part of the projection device illustrated in FIG. 2. FIG. 4 is a front schematic view of an optical module in the embodiment illustrated in FIG. 2. Please simultaneously refer to FIG. 2 to FIG. 4. The optical module 100 is configured on the transmission path of the image beam L2. In the embodiment, the optical module 100 is located between the light guide element 50 and the light valve 30. However, in another embodiment, the optical module 100 may be located between the light guide element 50 and the projection lens 40, and the invention is not limited thereto. It is worth noting that, in two embodiments with different configurations, the specific positions of the driving elements in the optical module 100 are also different, which will be described below in detail.

In the embodiment, the optical module 100 comprises a fixed portion 110, a first frame body 120, at least one first driving element 130, and an optical element 140. The first frame body 120 is pivoted to the fixed portion 110, wherein the first frame body 120 comprises a first side S1 and other three second sides S2. Specifically, the opposite two sides of the first frame body 120 have first rotation axes T1. The first frame body 120 oscillates around the first rotation axes T1, and the first rotation axes T1 and any side of the first frame body 120 are non-orthogonal and non-parallel. In detail, in the embodiment, one of the first rotation axes T1 is configured at the intersection between the first side S1 and one of the adjacent second sides S2. The other first rotation axis T1 is configured at the intersection between the second side S2 far away from the first side S1 and the other adjacent second side S2, as illustrated in FIG. 4. It is worth noting that, in the embodiment, the first virtual plane E1 through the projection lens 40 and perpendicular to the image beam L2 path intersects with the second virtual plane E2 through the light valve 30 and perpendicular to the image beam L2 path to form a virtual line segment K, the distance between the first side S1 of the first frame body 120 and the virtual line segment K is shorter than the distance between the other three second sides S2 of the first frame body 120 and the virtual line segment K. In other words, the first side S1 is adjacent to the extension intersection of the light valve 30 and the projection lens 40.

At least one first driving element 130 is configured on at least one of the other three second sides S2 of the first frame body 120 and configured to drive the first frame body 120 to oscillate back and forth. In the embodiment, the first driving element 130 comprises a magnet and a coil, but is not limited thereto. The first driving element 130 may also include an electromagnet. The first driving element 130 firstly uses the change of current to generate a magnetic field, and then oscillates by virtue of switching of the magnetic field, such that the first driving element 130 drives the first frame body 120 to oscillate at two different positions. The number of the first driving element 130 is only one and is configured on the second side S2 far away from the first side S1 in the first frame body 120, i.e., on the side, far away from the projection lens 40, in the optical module 100. However, in some embodiments, the first driving element 130 may be a single one configured on one of the second sides S2 adjacent to the first side S1, or two first driving elements 130 are configured on the second sides S2 adjacent to the first side S1, and the invention is not limited thereto. In other words, the configuration position of the first driving element 130 is far away from the extension intersection between the light valve 30 and the projection lens 40. Therefore, the size can be reduced and the projection lens 40 or the light valve 30 can be prevented from being interfered by the first driving element 130 in the optical module 100.

The optical element 140 is configured in the first frame body 120 and configured to allow the image beam L2 to pass. The optical element 140, for example, which may be glass, is embedded into the inner surface of the first frame body 120 and can refract the image beam L2 as it passes through. In other words, when oscillating, the optical element 140 oscillates with the first frame body 120 to enable the transmission path of the image beam L2 to produce a displacement in a first direction. When the image beam L2 produces a displacement in a unit of pixel distance with the oscillation of the optical module 100, the human eye will observe an effect that the resolution is doubled due to the persistence of vision. In this way, the resolution of the image can be enhanced, and the projection device 10 has good optical effect. At the same time, compared with the traditional configuration, the projection device 10 is lower in cost and smaller in size. The length of a long side in optical element 140 is smaller than or equal to 30 mm. For example, in the embodiment, when the optical module 100 is located between the light guide element 50 and the light valve 30, the area of the optical element 140 is 12*12 mm, but the invention is not limited thereto. In addition, in another embodiment, when the optical module 100 is located between the light guide element 50 and the projection lens 40, the area of the optical element 140 is, for example, 20*20 mm, but the invention is not limited thereto.

Figure 5:
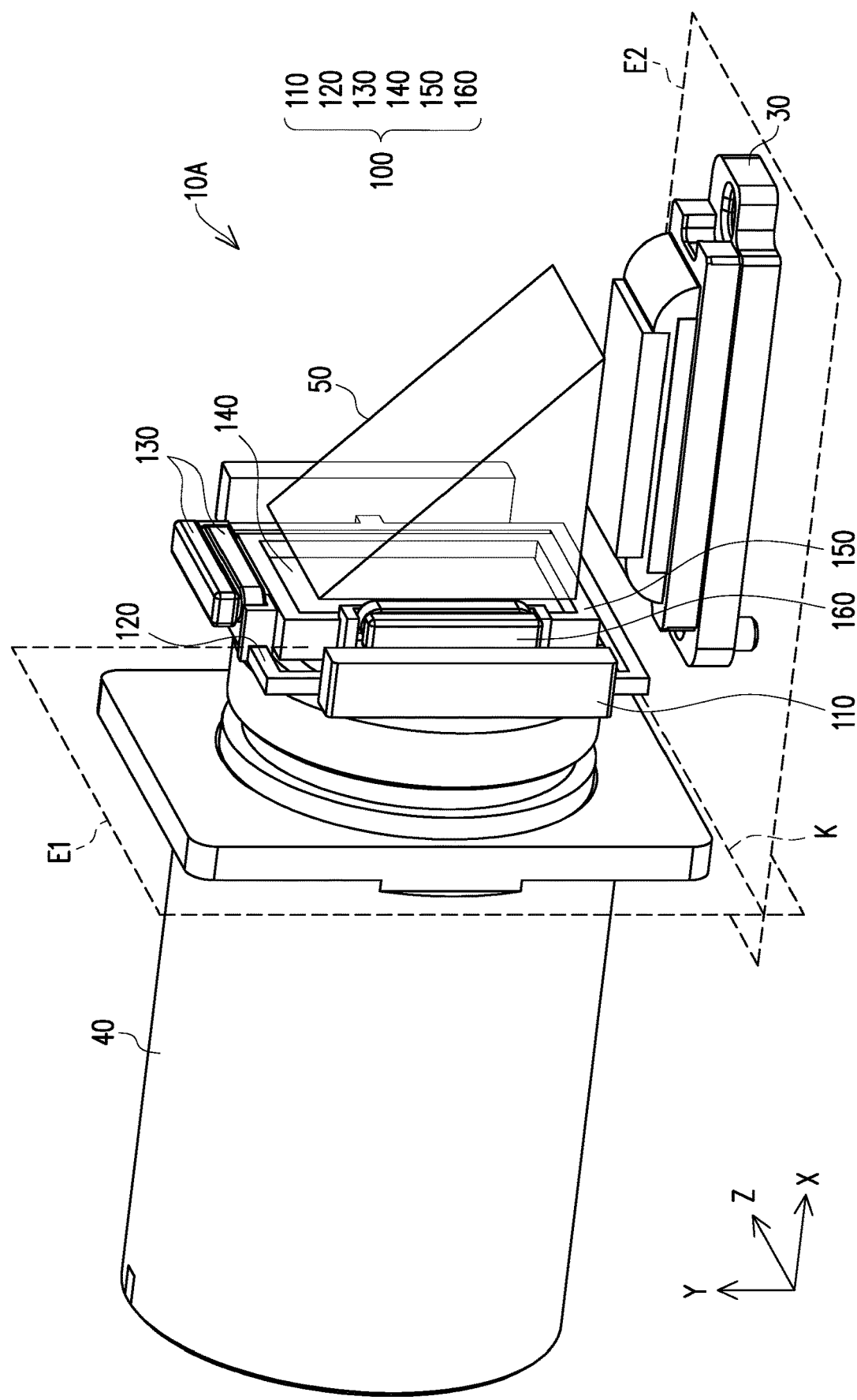
FIG. 5 is a stereoscopic schematic view of part of a projection device according to another embodiment of the invention.
Figure 6:
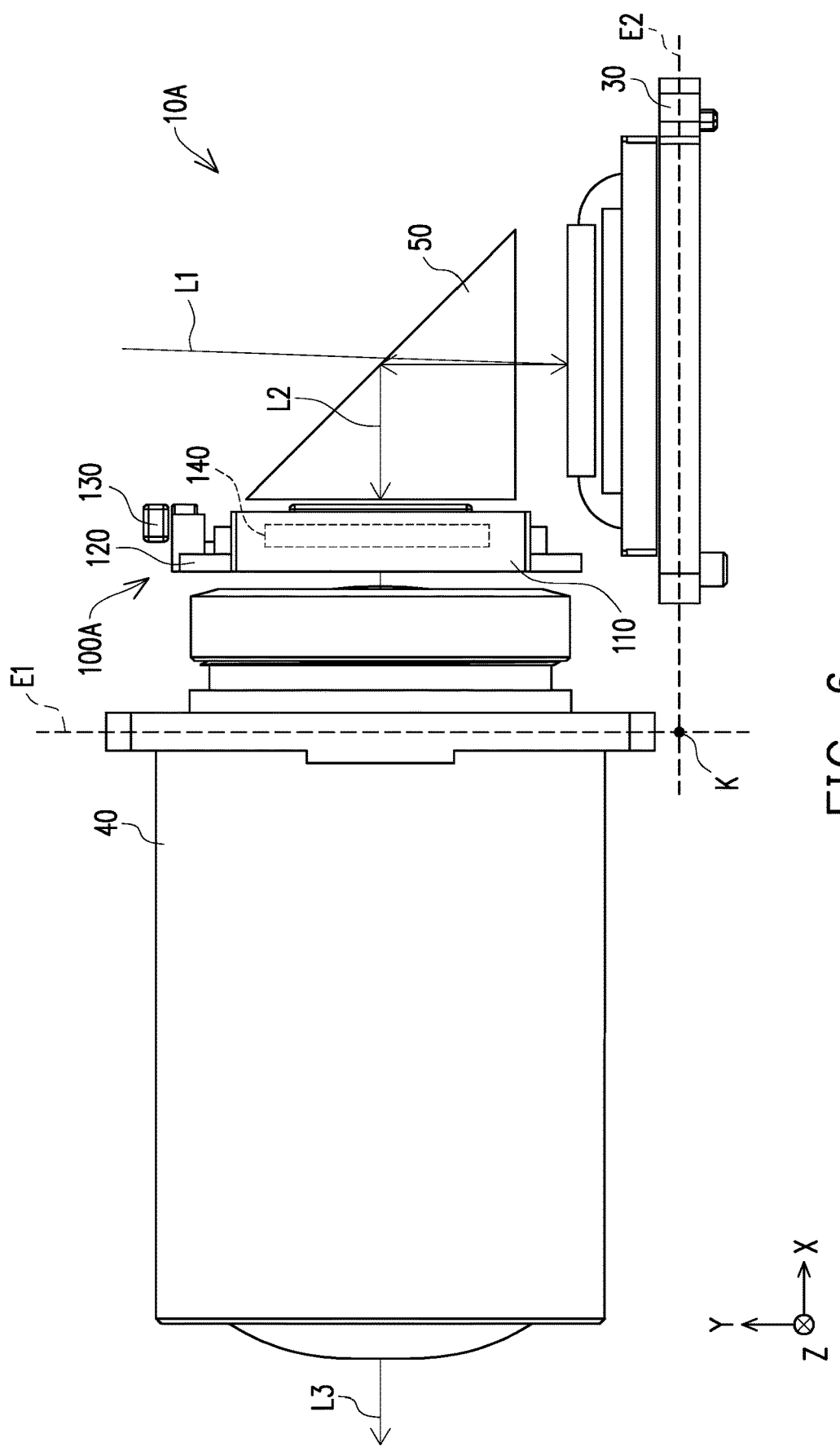
FIG. 6 is a side schematic view of part of the projection device illustrated in FIG. 5.
Figure 7:
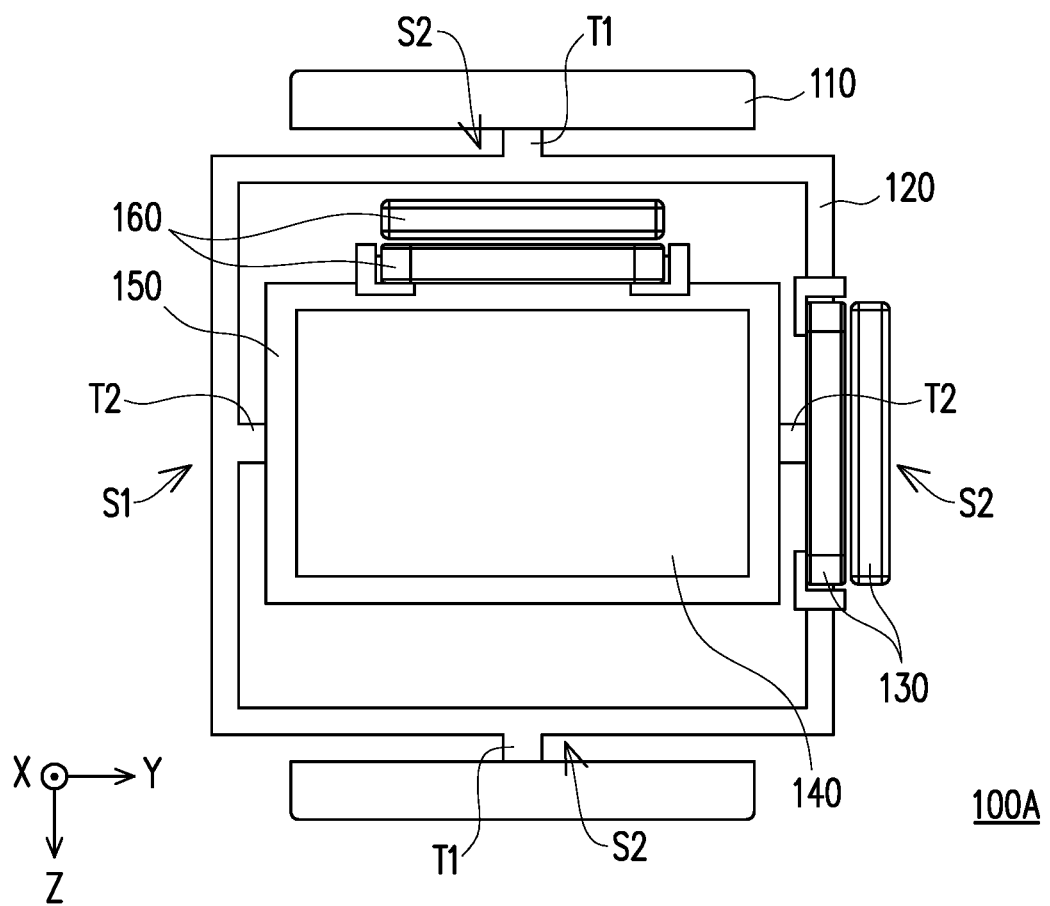
FIG. 7 is a front schematic view of an optical module in the embodiment illustrated in FIG. 5.

FIG. 5 is a stereoscopic schematic view of part of a projection device according to another embodiment of the invention. FIG. 6 is a side schematic view of part of the projection device illustrated in FIG. 5. FIG. 7 is a front schematic view of an optical module in the embodiment illustrated in FIG. 5. Please simultaneously refer to FIG. 5 to FIG. 7. Part of the projection device 10A in the embodiment is similar to part of the projection device 10 illustrated in FIG. 2. The difference is that, in the embodiment, the optical module 100A in the projection device 10A comprises a second frame body 150 and at least a second driving element 160 as compared with the optical module 100 illustrated in FIG. 2. The second frame body 150 is similar to the structure of the first frame body 120 and is configured in the first frame body 120. The second driving element 160 is configured on the second frame body 150. The second driving element 160 is configured to drive the second frame body 150 to oscillate back and forth.

In detail, in the embodiment, the second driving element 160, similar to the first driving element 130, comprises a magnet and a coil, but is not limited thereto, and the second driving element 160 may also comprise an electromagnet. For the detailed structure and implementation mode of the second driving element 160, a reference may be made to in the implementation description of the first driving element 130 described above, which thus will not be repetitively described. In the embodiment, the number of the second driving element 160 is only one. However, in other embodiments, the number of the second driving element 160 may be two. In the embodiment, the second frame body 150 oscillates around a second rotation axis T2 (e.g., the Y-axis direction in the invention), and the first rotation axis T1 (e.g., the Z-axis direction in the embodiment) and the second rotation axis T2 are non-parallel, and the positions where the second driving element 160 and the first driving element 130 are placed cannot be coaxial, and thus cannot be configured on the same side. In the embodiment, the first rotation axis T1 and the second rotation axis T2 are perpendicular to each other as an example, but the invention is not limited thereto. When oscillating, the optical element 140 oscillates with the second frame body 150 such that the transmission path of the image beam L2 produces a displacement in a second direction (e.g., the Z-axis direction in the embodiment). The second direction and the first direction (e.g., the Y-axis direction in the embodiment) are non-parallel. In the embodiment, the second direction and the first direction are perpendicular to each other, but the invention is not limited thereto. In addition, similar to the first driving element 130, the configuration position of the second driving element 116 is also far away from the extension intersection of the light valve 30 and the projection lens 40.

In the embodiment, the optical element 140 is embedded into the inner surface of the second frame body 150. The length of a long side in the optical element 140 is smaller than or equal to 30 mm. In addition, in the embodiment, the optical module 100A is located between the light guide element 50 and the projection lens 40. In this case, the area of the optical element 140 is, for example, 20*20 mm. However, in another embodiment, the optical module 100A may also be located between the light guide element 50 and the light valve 30. In this case, the area of the optical element 140 is, for example, 12*12 mm. However, the invention is not limited thereto.

In other words, when oscillating, the optical element 140 oscillates with the first frame body 120 and the second frame body 150 such that the transmission path of the image beam L2 respectively produces a displacement in the first direction and the second direction which are different directions. When the image beam L2 produces a displacement in a unit of pixel distance with the oscillation of the optical module 100A, the human eye will observe an effect that the resolution is quadrupled due to the persistence of vision. In this way, the resolution of the image can be enhanced, and the projection device 10A has good optical effect. At the same time, compared with the traditional configuration, the projection device 10A is lower in cost and smaller in size.

To sum up, the embodiment of the invention has at least one of the following advantages or effects. In the projection device provided by the embodiment, the optical module used for enhancing the image resolution comprises a first frame body and at least one first driving element configured thereon, wherein the configuration position of the at least one first driving element is far away from the extension intersection between the projection lens and the light valve. Therefore, the size can be reduced and the projection lens or light valve can be prevented from being interfered by the first driving element in the optical module. In this way, the resolution of the image can be enhanced and the projection device has good optical effect. At the same time, compared with the traditional configuration, the projection device has the advantages of lower cost and smaller size.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprises:
    an illumination system, configured to provide an illumination beam;
    a light valve, configured on the transmission path of the illumination beam and configured to convert the illumination beam into an image beam;
    a light guide element, configured on the transmission path of the image beam and located between the illumination system and the light valve;
    an optical module, configured on the transmission path of the image beam, and the optical module comprises:
        a fixed portion;
        a first frame body, pivoted to the fixed portion, wherein the first frame body comprises a first side and other three second sides;
        at least one first driving element, configured on at least one of the other three second sides of the first frame body and configured to drive the first frame body to oscillate back and forth; and
        an optical element, configured in the first frame body and configured to allow the image beam to pass; and
    a projection lens, configured on the transmission path of the image beam and configured to convert the image beam into a projection beam, wherein a first virtual plane of the projection lens intersects with a second virtual plane of the light valve to form a virtual line segment, wherein the distance between the first side of the first frame body and the virtual line segment is shorter than the distance between the other three second sides of the first frame body and the virtual line segment, and when oscillating, the optical element oscillates with the first frame body to enable the transmission path of the image beam to produce a displacement in a first direction.

2. The projection device according to claim 1, wherein the optical module is located between the light guide element and the light valve, and the at least one first driving element is located on the side, far away from the projection lens, in the optical module.

3. The projection device according to claim 1, wherein the optical module is located between the light guide element and the projection lens, and the at least one first driving element is located on the side, far away from the light valve, in the optical module.

4. The projection device according to claim 1, wherein the at least one first driving element comprises a magnet and a coil.

5. The projection device according to claim 1, wherein the first frame body oscillates around a first rotation axis, and the first rotation axis is non-orthogonal and non-parallel to any side of the first frame body.

6. The projection device according to claim 1, wherein the optical element is embedded into the inner surface of the first frame body.

7. The projection device according to claim 1, wherein the optical module further comprises a second frame body and at least one second driving element, wherein,
the second frame body is configured in the first frame body;
the at least one second driving element is configured on the second frame body, wherein the at least one second driving element is configured to drive the second frame body to oscillate back and forth, when oscillating, the optical element oscillates with the second frame body to enable the transmission path of the image beam to produce a displacement in a second direction, and the second direction is non-parallel to the first direction.

8. The projection device according to claim 7, wherein the at least one first driving element and the at least one second driving element comprise a magnet and a coil.

9. The projection device according to claim 7, wherein the first frame body oscillates around a first rotation axis, the second frame body oscillates around a second rotation axis, and the first rotation axis is non-parallel to the second rotation axis.

10. The projection device according to claim 7, wherein the optical element is embedded into the inner surface of the second frame body.

11. The projection device according to claim 1, wherein the diagonal length of the light valve is smaller than or equal to 0.33 inch.

12. The projection device according to claim 1, wherein the length of a long side in the optical element is smaller than or equal to 30 mm.

13. The projection device according to claim 1, wherein the shortest light path length from the light valve through the light guide element to the projection lens is smaller than or equal to 50 mm.

14. The projection device according to claim 1, wherein the optical axis direction of the projection lens is perpendicular to the normal direction of the light valve.

* * * * *